United States Patent
Badiger

(10) Patent No.: US 12,359,412 B2
(45) Date of Patent: *Jul. 15, 2025

(54) CLICKER DRAIN ASSEMBLY AND METHOD OF ASSEMBLING SAME

(71) Applicant: Kohler Co., Kohler, WI (US)

(72) Inventor: Sharathkumar B. Badiger, Cedarburg, WI (US)

(73) Assignee: KOHLER CO., Kohler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,746

(22) Filed: May 13, 2024

(65) Prior Publication Data

US 2024/0295105 A1   Sep. 5, 2024

Related U.S. Application Data

(63) Continuation of application No. 17/575,325, filed on Jan. 13, 2022, now Pat. No. 12,018,470.

(60) Provisional application No. 63/145,203, filed on Feb. 3, 2021.

(51) Int. Cl.
   *E03C 1/23* (2006.01)
   *F16J 15/3268* (2016.01)
   *F16J 15/3284* (2016.01)

(52) U.S. Cl.
   CPC ......... *E03C 1/2306* (2013.01); *F16J 15/3268* (2013.01); *F16J 15/3284* (2013.01)

(58) Field of Classification Search
   CPC ... E03C 1/2306; E03C 1/2304; F16J 15/3268; F16J 15/3284
   USPC .............................................. 4/684, 689, 688
   See application file for complete search history.

(56) References Cited

U.S. PATENT DOCUMENTS

| 3,220,695 A | 11/1965 | Downey et al. |
| 3,366,980 A | 2/1968 | Petursson |
| 3,995,333 A | 12/1976 | Stephens |
| 4,860,390 A | 8/1989 | Ohta |
| 6,195,819 B1 | 3/2001 | Wang |
| 6,880,179 B2 * | 4/2005 | Wang ....................... A47K 1/14 4/286 |
| 7,013,500 B1 | 3/2006 | Lin |

(Continued)

FOREIGN PATENT DOCUMENTS

| EP | 1477097 A1 * | 11/2004 | ............... A47K 1/14 |
| EP | 3486381 A1 * | 5/2019 | ............... E03C 1/14 |
| WO | WO-2010016871 A1 * | 2/2010 | ............... E03C 1/23 |

OTHER PUBLICATIONS

Non-Final Office Action on U.S. Appl. No. 17/575,325 DTD Oct. 25, 2023.

(Continued)

*Primary Examiner* — Lori L Baker
(74) *Attorney, Agent, or Firm* — FOLEY & LARDNER LLP

(57) ABSTRACT

A clicker drain assembly includes a unitary main drain body. The clicker drain assembly further includes a drain stopper assembly, a clicker drain seal, an actuating assembly, and a drain trim ring. The drain trim ring is configured to couple to the main drain body and receive the clicker drain seal and the actuating assembly. The stopper assembly is configured to couple to the actuating assembly and actuate the actuating assembly when pressed by a user.

20 Claims, 7 Drawing Sheets

(56) References Cited

U.S. PATENT DOCUMENTS

| | | | |
|---|---|---|---|
| 8,214,942 B2* | 7/2012 | Yang | E03C 1/262 4/690 |
| 8,499,376 B2* | 8/2013 | Kyung Kim | E03C 1/2306 4/689 |
| 9,060,656 B2* | 6/2015 | Tong | E03C 1/23 |
| 9,095,239 B2 | 8/2015 | Laera | |
| 9,115,485 B2* | 8/2015 | Kergoet | E03C 1/22 |
| 10,246,861 B2* | 4/2019 | Beck | E03C 1/23 |
| 10,487,485 B2* | 11/2019 | Dekoning | E03C 1/2302 |
| 11,391,027 B1* | 7/2022 | Ali | E03C 1/2306 |
| 2004/0154095 A1 | 8/2004 | Rhodes | |
| 2008/0178382 A1* | 7/2008 | Pinette | E03C 1/2306 4/689 |
| 2010/0024108 A1* | 2/2010 | Yang | E03C 1/2306 4/295 |
| 2010/0235983 A1* | 9/2010 | Jones | A47K 1/14 4/689 |
| 2010/0275357 A1* | 11/2010 | Fuoco | E03C 1/23 4/295 |
| 2010/0325792 A1* | 12/2010 | Edmonds | E03C 1/232 4/682 |
| 2013/0042406 A1* | 2/2013 | Marotz | E03C 1/2304 137/359 |
| 2013/0042407 A1* | 2/2013 | Marotz | E03C 1/232 4/679 |
| 2016/0145843 A1* | 5/2016 | Marotz | E03C 1/232 4/688 |
| 2017/0306598 A1* | 10/2017 | McAlpine | E03C 1/24 |
| 2018/0127961 A1 | 5/2018 | Homami et al. | |
| 2018/0156969 A1* | 6/2018 | Mooren | F21V 33/004 |
| 2018/0263426 A1 | 9/2018 | Ahuja et al. | |
| 2019/0127961 A1* | 5/2019 | Jones, Jr. | F16J 15/3284 |
| 2021/0324617 A1* | 10/2021 | Stout | E03C 1/20 |
| 2022/0042292 A1* | 2/2022 | Ahuja | E03C 1/2306 |

OTHER PUBLICATIONS

Notice of Allowance on U.S. Appl. No. 17/575,325 DTD Feb. 14, 2024.

* cited by examiner

CLICKER DRAIN ASSEMBLY AND METHOD OF ASSEMBLING SAME

CROSS REFERENCE TO RELATED PATENT APPLICATIONS

This application claims the benefit of and priority to U.S. patent application Ser. No. 17/575,325 filed Jan. 13, 2022, which claims the benefit and priority to U.S. Provisional Patent Application No. 63/145,203 filed Feb. 3, 2021. The entire disclosure of U.S. patent application Ser. No. 17/575,325 and U.S. Provisional Patent Application No. 63/145,203 are incorporated by reference herein.

BACKGROUND

The present disclosure relates generally to plumbing fixtures. More specifically, the present disclosure relates to drain assemblies used to control the flow of fluid through a drain opening of a basin, such as a sink or a bath tub.

There are variety of mechanisms for controlling drain passages in plumbing fixtures, for example, simple stops and plugs linked to a pull-up lever, and pop-up style drain plugs. Pop-up drain plugs are advantageous because the mechanism for opening and closing the drain is contained in a compact package set within or beneath the drain, without linkages, levers or other components that need to be concealed and routed through walls, under spaces and the like. Pop-up drain plugs are also advantageous because the push-bottom type movement required by the user for actuation is simple and intuitive. The user needs to merely press down on the drain plug, such as by stepping on it or using one's hand, to alternately toggle between open and closed positions. Another advantage of pop-up drain plugs is that they typically can be installed from above the basin, rather than the often cramped, dark space beneath the basin.

Current clicker drains require very expensive materials with a main body split into two parts. Many components are made from brass casting and include multiple components to assemble, contain a number of leak paths, and require a significant amount of assembly time. The following description focuses primarily on a clicker drain with a single body design for use in a sink basin, but it should be appreciated that the disclosed drain stopper can be used in other bathing or shower environments (e.g., bathtubs, etc.) to provide a more efficient and cost effective solution. Thus, it would be advantageous to provide an improved clicker drain assembly that overcomes the foregoing challenges and provides a number of advantages, including reduction in leak passages, components, assembly time, and cost. These and other advantageous features will become apparent to those reviewing the present disclosure.

SUMMARY

At least one embodiment relates to a clicker drain assembly. The clicker drain assembly includes a single, unitary main drain body. The clicker drain assembly further includes a drain stopper assembly, a clicker drain seal, an actuating assembly, and a drain trim ring. The drain trim ring is configured to couple to the main drain body and receive the clicker drain seal and the actuating assembly. The stopper assembly is configured to couple to the actuating assembly and actuate the actuating assembly when pressed by a user.

Another embodiment relates to a drain assembly. The drain assembly includes a main drain body, a main body seal, a main body washer, a main body nut, a drain trim ring, and an actuating assembly. The main drain body includes a single unitary construction with a first end and a second end. The main drain body includes one or more overflow openings positioned proximate the first end and an engagement structure disposed along at least a portion of the main drain body proximate the first end. The drain trim ring is configured to interface with the main drain body to form a seal. The drain trim ring includes a ring body defining an annular body, an angled surface, and a flange. The actuating assembly is at least partially receive with in the drain trim ring. The actuating assembly is selectively repositionable between an open position and a closed position. The main body seal, main body washer, and main body nut extend radially outward from an outer surface of the main drain body.

Another embodiment relates to a method of assembling a drain assembly. The method includes providing a main body having a single unitary construction and comprising a main body seal, a main body washer, and a main body nut. The method further includes threadably coupling a drain trim ring to the main body. The method further includes threadably engaging the main body nut to secure the main body seal and the main body washer. The main body seal and the main body washer abut an internal surface of an opening. The method further includes coupling an actuating assembly to the main body.

This summary is illustrative only and should not be regarded as limiting.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, disclosed herein is a single body clicker drain assembly that is more efficient and reliable than conventional clicker drain assemblies. The disclosed clicker drain assembly includes a single, unitary drain body that reduces the number of potential leak paths and the number of components required to assemble, thereby reducing the assembly time and manufacturing cost. The clicker drain assembly also includes a drain stopper, a forged trim ring, and a cold rolled steel washer to support the rubber seal at a base of sink and assist to hug the body and seal tightly, which helps to further reduce the number of potential leak paths and the overall cost of the assembly. Many existing drain assemblies include components made from brass casting, too many components to assemble, and multiple leak paths. The aforementioned clicker drain assembly described herein addresses these problems.

Figure 6:
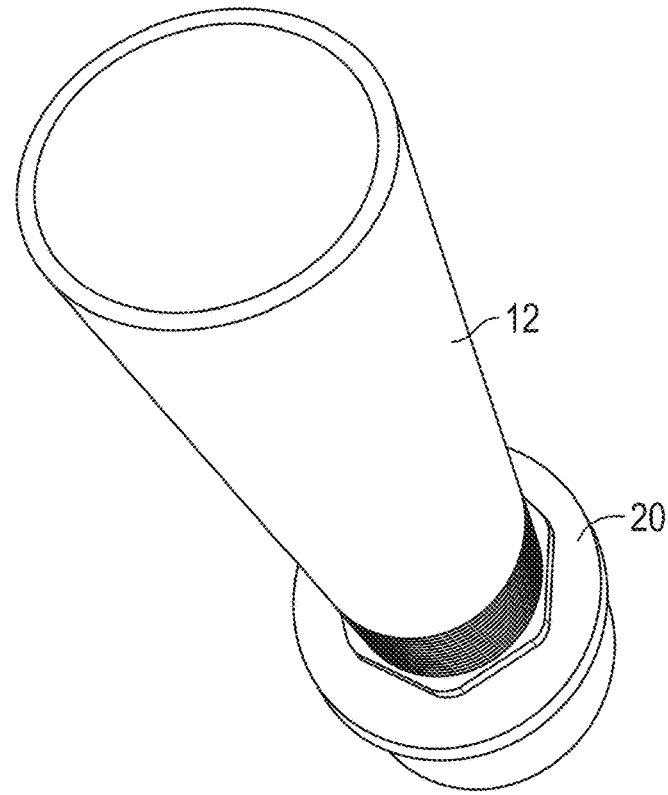
FIG. 6 is a perspective bottom view of a main drain body of the clicker drain assembly shown in FIG. 1.

Referring to FIGS. 1-5, a drain assembly 10 is illustrated according to an exemplary embodiment. The drain assembly 10 includes a main drain body 12 having a proximal end and a distal end. The main drain body 12 is sized and shaped to fit inside a drain of a sink or bathtub basin and is configured to support the connection between the other components of the drain assembly 10. The main drain body 12 is a single unitary hollow cylindrical member (e.g., tubular, 1.250 OD×0.062" wall), as opposed to a split drain body configuration in other clicker drain assemblies. The main drain body 12 defines an internal cavity having a first diameter. For instance, the internal cavity allows fluid to flow through from the basin and out the distal end of the main drain body 12 (e.g., see FIG. 6). The main drain body 12 can be made from stainless steel. A stainless steel main drain body 12 facilitates a reduction in cost compared to brass drain assemblies while retaining necessary stability and durability.

The drain assembly 10 can include a threaded portion 14 on an outer surface of the main drain body. The threaded portion 14 may cover at least a portion of the main drain body 12. For instance, the threaded portion 14 can be disposed along the outer surface of the proximal end of the main drain body 12 (e.g., the top half, the top quarter, etc. of the main drain body 12). In various embodiments, the threaded portion 14 may cover the entire outer surface of the main drain body 12. The threaded portion 14 facilitates coupling between the main drain body 12 and other components of the assembly, as will be described herein.

The main drain body 12 may further include at least one overflow opening 16. The at least one overflow opening 16 (e.g., overflow slots, apertures, etc.) may be disposed on the threaded portion 14. In other words, the at least one overflow opening 16 may be located at the proximal end of the main drain body 12. The at least one overflow opening 16 can include two overflow openings. In such a configuration with two overflow openings, the overflow openings may be located opposite each other. The at least one overflow opening 16 can include more than two overflow openings. In such a configuration, the at least one overflow opening 16 can be spaced equally around the circumference of the main drain body 12. The at least one overflow opening 16 may be circular, rectangular, oblong, etc. The at least one overflow opening 16 is a through-hole through the main drain body to allow flow of the fluids from out from the internal cavity of the main drain body 12 as an overflow prevention mechanism. However, the main drain body 12 may be provided in applications without an overflow opening.

The drain assembly 10 further includes a main body seal 18, a main body washer 20, and a main body nut 22. The main body seal 18, the main body washer 20, and the main body nut 22 may be disposed around the main drain body 12 such that the main body seal 18, the main body washer 20, and the main body nut 22 extend radially outward from the outer surface of the main drain body 12. The main body seal 18, the main body washer 20, and the main body nut 22 may be disposed below the at least one overflow opening 16, toward the distal end. The main body seal 18 may be stacked proximal to the main body nut 22, the main body washer 20 being between the main body seal 18 and the main body nut 22. For instance, the main body nut 22 may be threadably coupled to the threaded portion 14 to secure the main body seal 18 and main body washer 20 in place. The main body nut 22 is tightened and screwed proximally thus tightening the main body seal 18 and the main body washer 20 against the underside of a drain opening. The main body washer 20 may includes a lip disposed around the circumference of the main body washer 20 to support the main body seal 18 and provide an enhanced seal joint. The main body seal 18 may be a T-Styrene rubber or other suitable O-ring. The main body washer 20 may be cold rolled steel, stamped, or other suitable material. The main body nut 22 may be brass or other suitable material.

Figure 1:
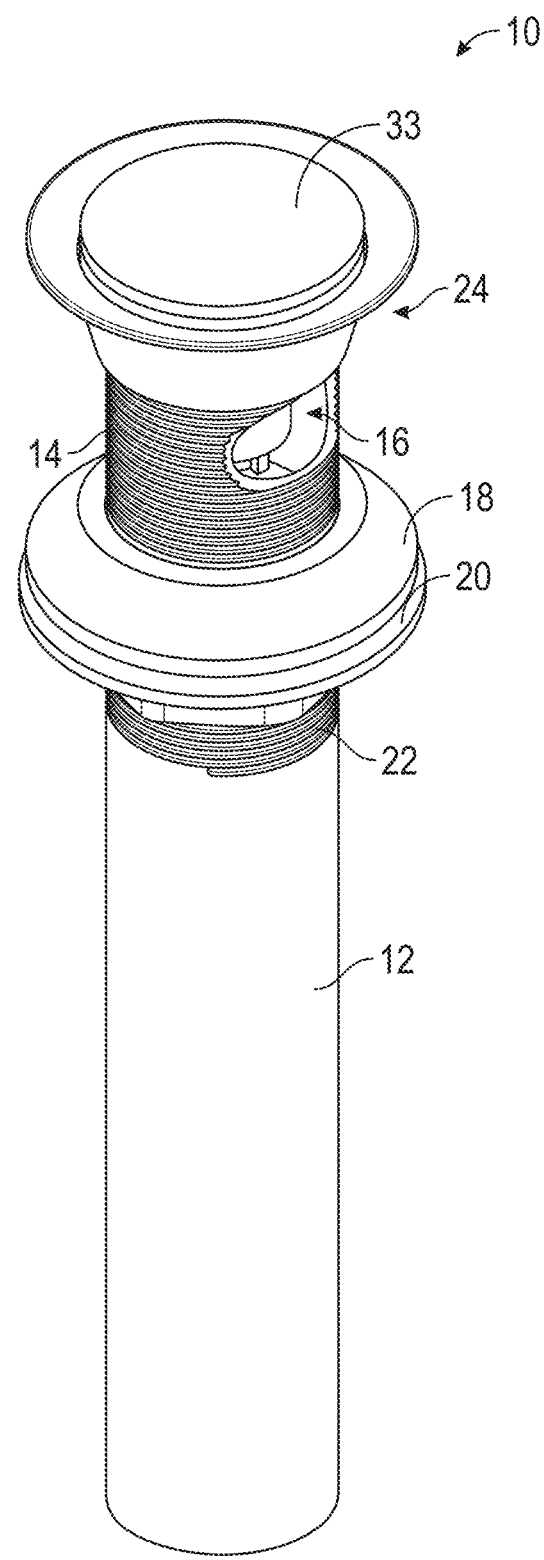
FIG. 1 is a perspective view of a clicker drain assembly, in accordance with an exemplary embodiment of the present disclosure.
Figure 2:
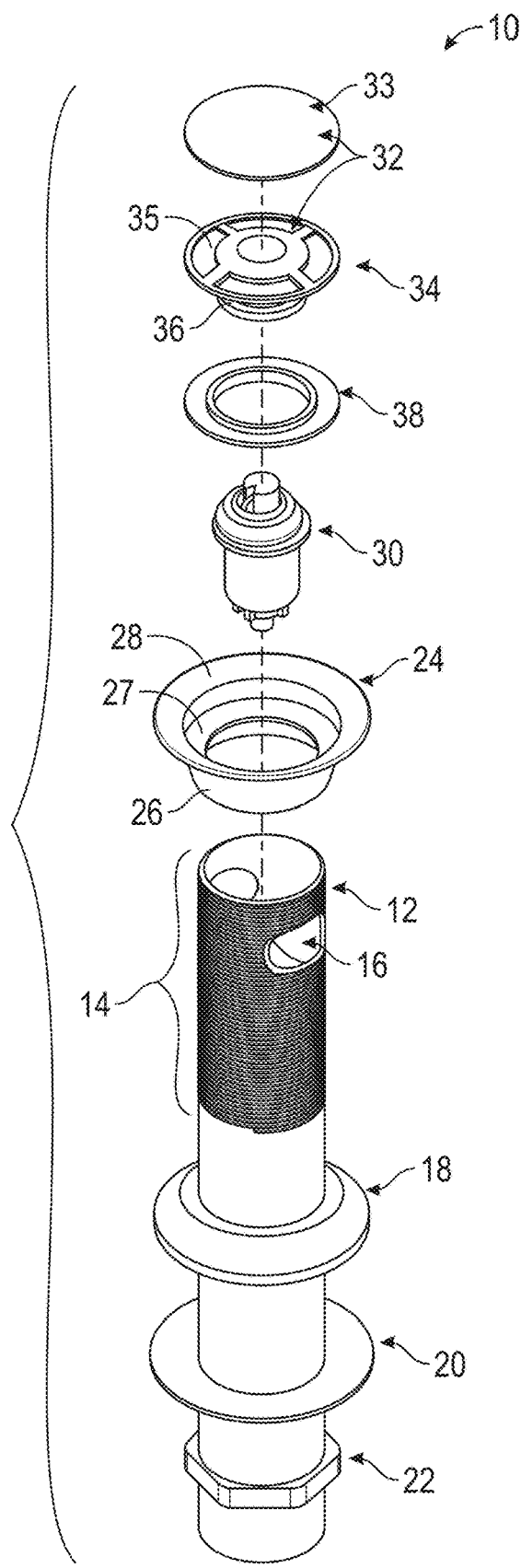
FIG. 2 is an exploded view of the clicker drain assembly shown in FIG. 1.
Figure 3:
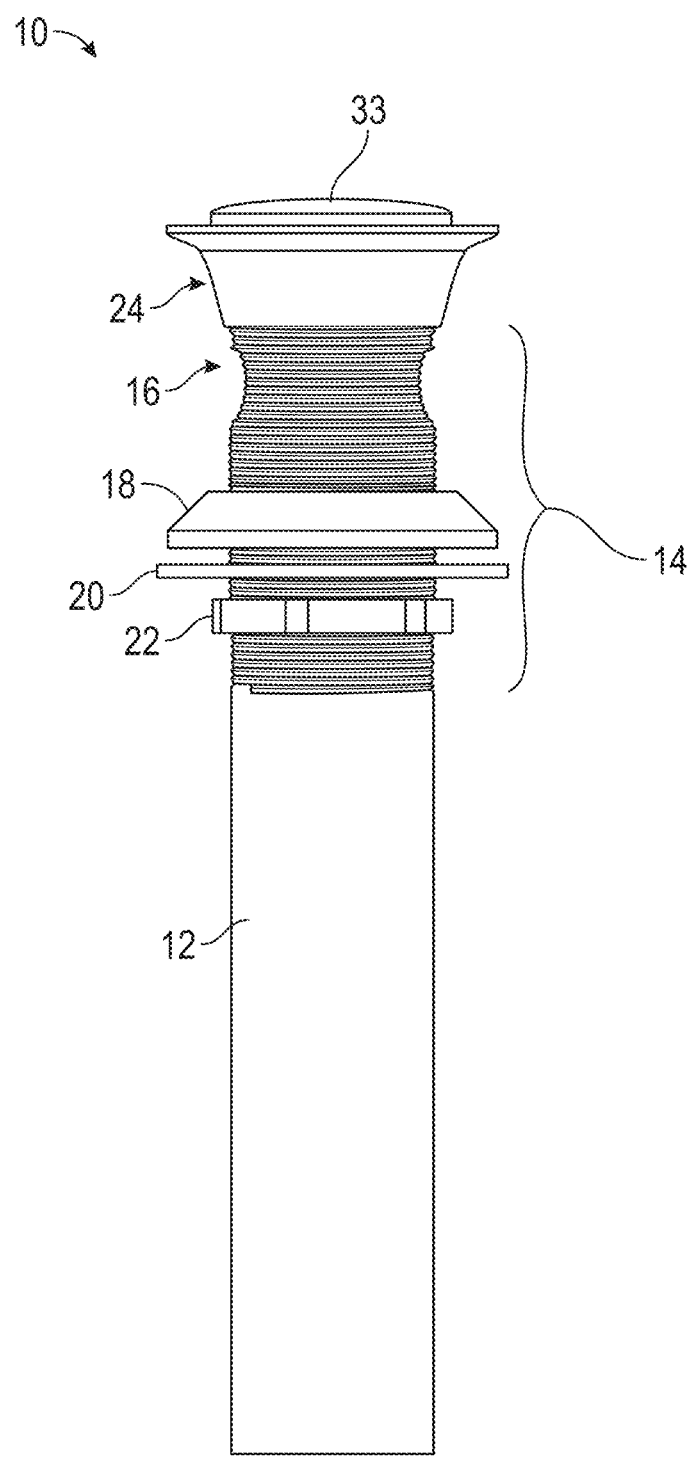
FIG. 3 is a schematic view of the clicker drain assembly shown in FIG. 1.
Figure 4:
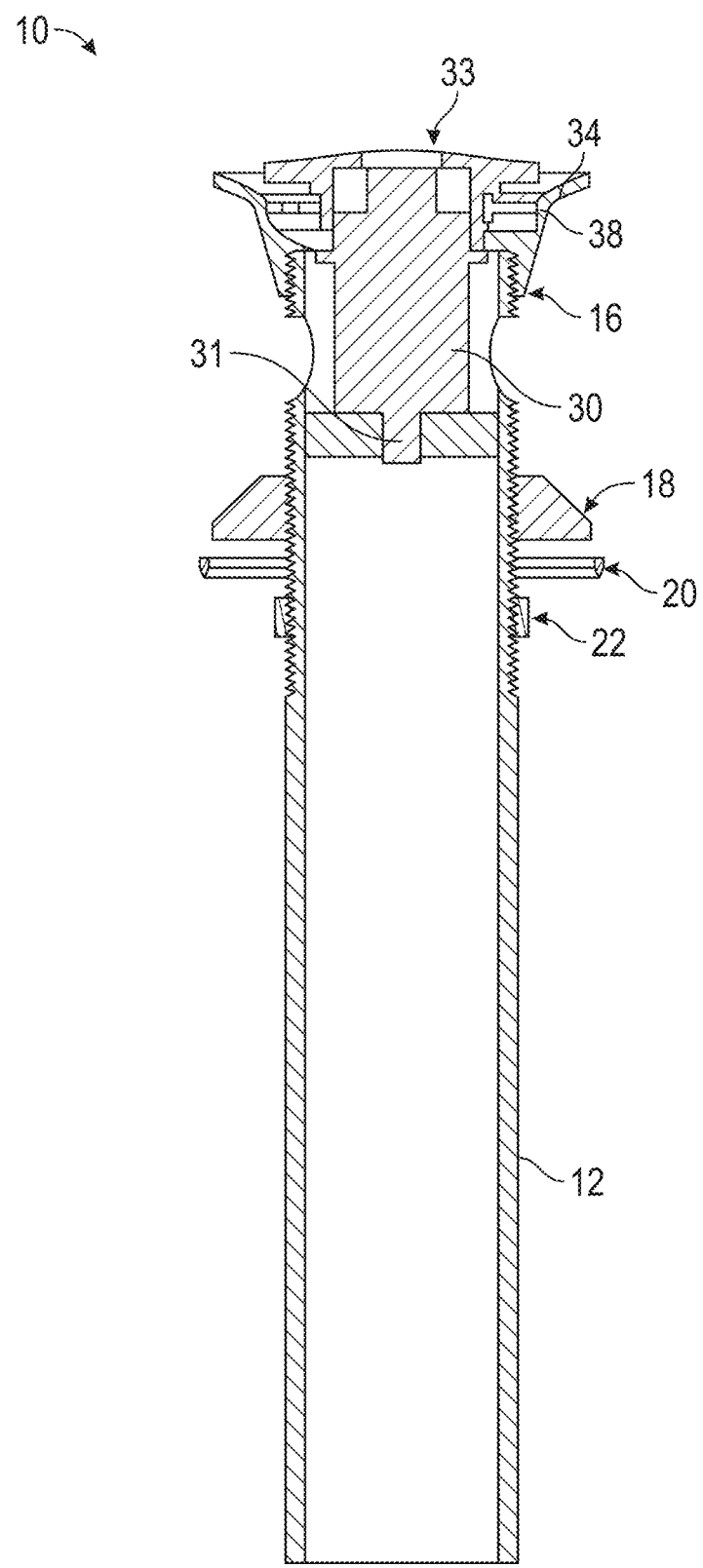
FIG. 4 is a cross-section view of the clicker drain assembly shown in FIG. 1.
Figure 5:
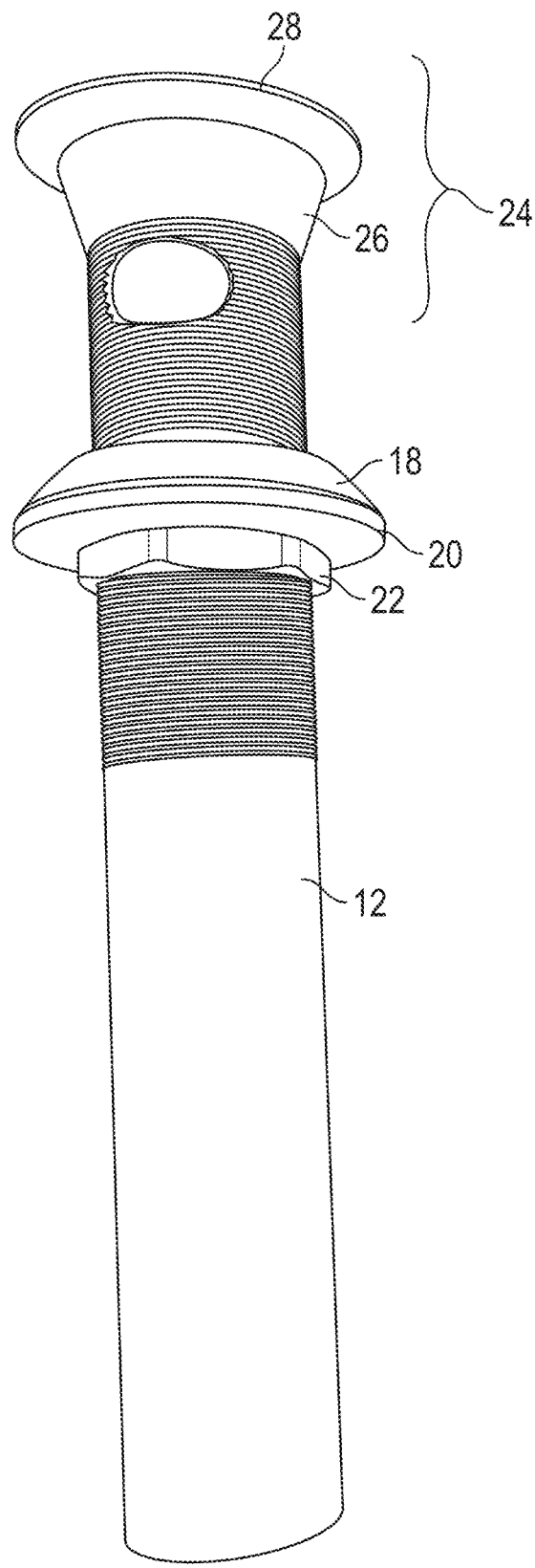
FIG. 5 is a side view of clicker the drain assembly shown in FIG. 1.

Referring still to FIGS. 1-5, the drain assembly 10 includes a drain trim ring 24. As can be seen in FIG. 2, the drain trim ring 24 includes a ring body 26, an angled surface 27, and a flange 28. The ring body 26 is an annular member defining an opening, the ring body 26 having a second diameter greater than the first diameter. The angled surface 27 connects the ring body 26 and the flange 28. The angled surface 27 extends radially outward from the ring body 26, and the flange 28 extends radially outward from the angled surface 27. The flange 28 defines a third diameter greater than the second diameter. As such, the drain trim ring 24 is a generally frustoconical, hollow shape and defines a seal area, as will be described further herein. The drain trim ring 24 is configured to couple to the main drain body 12. For instance, the ring body 26 is configured to threadably couple to the threaded portion 14 proximal to the at least one overflow opening 16. The flange 28 having the third diameter greater than a diameter of a drain opening such that the flange 28 prevents the ring body 26 from dropping into the drain and secures the main drain body 12 in place. In various embodiments, the ring body 26 may be configured to snap on to the main drain body 12. In various embodiments, the second diameter is less than the first diameter such that the ring body 26 is received by the main drain body 12 whether threaded or snap-fit. As such, the drain trim ring 24 directly interfaces with the main drain body 12 to form the seal, as described herein, as opposed to connecting to a secondary piece which is coupled to the drain. This configuration reduces the number of leak paths throughout the drain assembly 10. The drain trim ring 24 may be a forged drain trim ring in brass or other suitable material.

Figure 8:
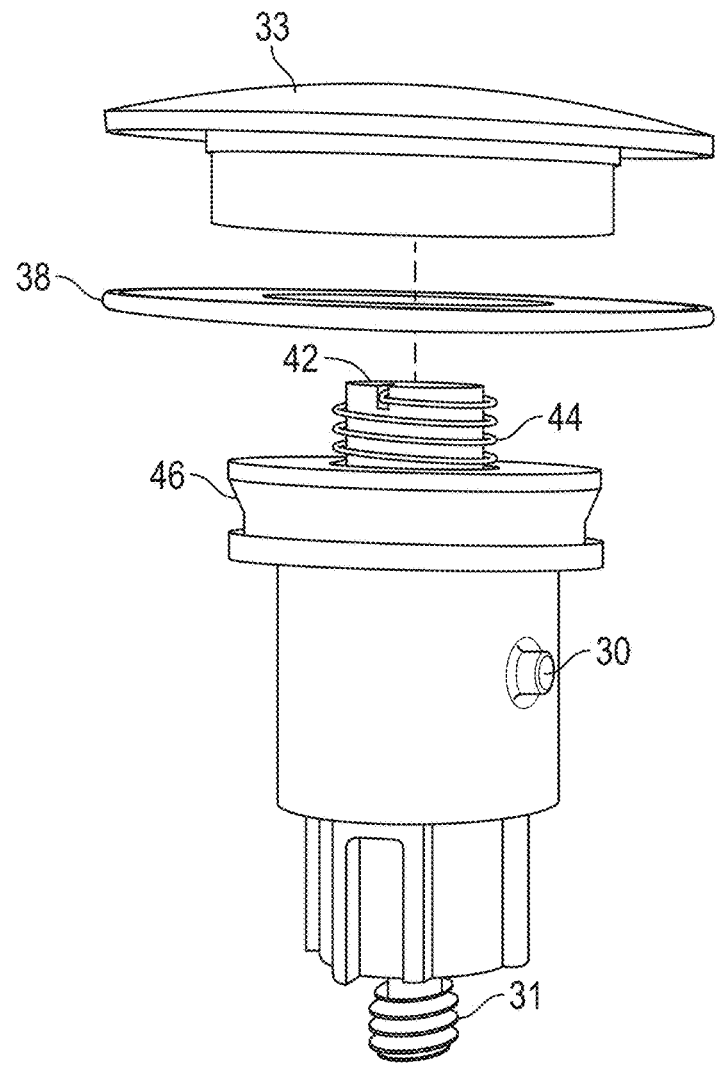
FIG. 8 is a perspective top view of a stopper head of the clicker drain assembly shown in FIG. 1.

The drain assembly 10 further includes an actuating assembly 30. The actuating assembly 30 may be a known spring biased actuating assembly 30. The drain trim ring 24 is configured to receive the actuating assembly 30. For instance, the actuating assembly 30 may include a spring 44, a cam insert 42, and a gasket 46 (e.g., see FIG. 8). Further, the actuating assembly 30 may include a support stem 31. The support stem 31 is configured to be coupled to a cross bar of the main drain body 12. The cross bar may be configured with an aperture configured to receive the support stem 31. For instance, the support stem 31 may be threadably coupled to the cross bar or may have a snap fit. Such a configuration eliminates the need for extra couplings and piping sections that may contribute to assembly time and risk of leaking. The actuating assembly 30 is configured to actuate (e.g., trigger, move, position) the drain assembly 10 from an open position to a closed position. For instance, the open position is defined by the actuating assembly 30 being in a released state such that the at least one overflow opening 16 is configured to receive the flow of fluid. The closed position is defined by the actuating assembly 30 being in a compressed stated such that the proximal end of the main drain body 12 is blocked, or sealed. The actuating assembly 30 may be manually operable by a user.

Figure 7:
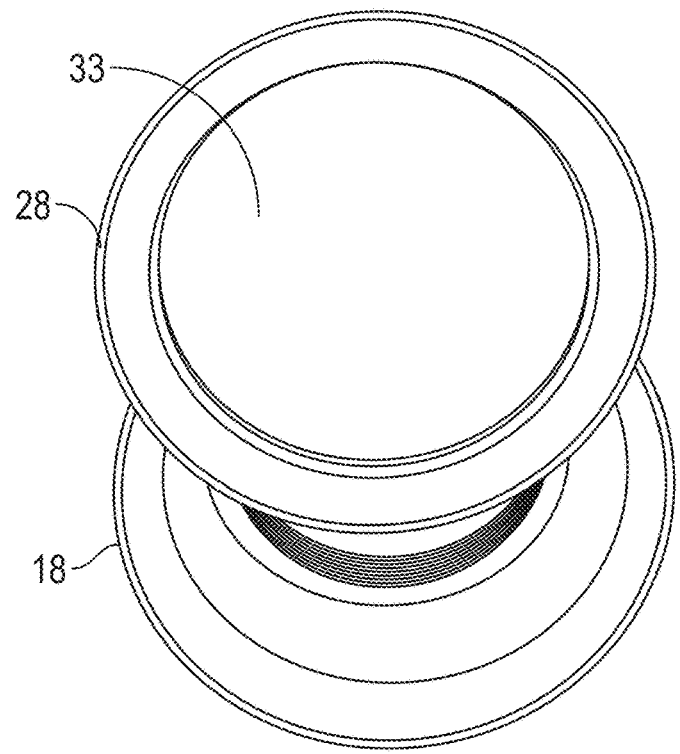
FIG. 7 is a side view of an actuating assembly of the clicker drain assembly shown in FIG. 1.

The drain assembly 10 includes a drain stopper assembly 32 and a clicker drain seal 38. The drain stopper assembly 32 includes a stopper head 33 and a stopper body 34. The stopper head 33 is a surface (e.g., disk, plate, etc.) configured to conceal the drain opening of the sink basin and provides a surface for the user to press against (e.g., push down toward the drain opening, apply a force) when operating the drain stopper assembly 32 by hand or foot (e.g., see FIG. 7). For instance, the stopper head 33 has a fourth diameter greater than the diameter of the drain opening such that when the user applies the force, the stopper goes toward the drain opening to cover and seal the drain opening. In other words, the fourth diameter of the stopper head 33 is smaller than the third diameter of the flange 28 such that the stopper head 33 may be received by the drain trim ring 24. The stopper head 33 may be polished crimped stainless steel. The stopper body 34 is a molded plastic part configured to mate with the stopper head 33. For instance, as shown in FIG. 2, the stopper body 34 has a top 35 with grooves corresponding with ridges on an underside of the stopper head 33, thus creating a snap-fit mechanism between the stopper head 33 and the stopper body 34. In various embodiments, the stopper head 33 may be omitted, particularly if the stopper head 33 is used for aesthetic purposes. As such, the top 35 may be configured as the interface between the user and the drain assembly 10. The stopper body 34 further includes a projection 36 extending distally from the top 35. The projection 36 may be cylindrical with a groove disposed around an outer surface of the projection, the groove configured to receive the clicker drain seal 38. For instance, the clicker drain seal 38 is an annular seal (e.g., rubber gasket, O-ring) with an aperture sized to receive the projection 36. The drain stopper assembly 32, the clicker drain seal 38, and the actuating assembly 30 together are received by the drain trim ring 24 along the seal area, so as to create a seal when actuated. For instance, the clicker drain seal 38 rests on the inner angled surface 27 (e.g., the seal area). When the actuating assembly 30 is actuated, the clicker drain seal 38 is pressed against the drain trim ring 24, thus restricting the flow though the main drain body 12.

Figure 9:
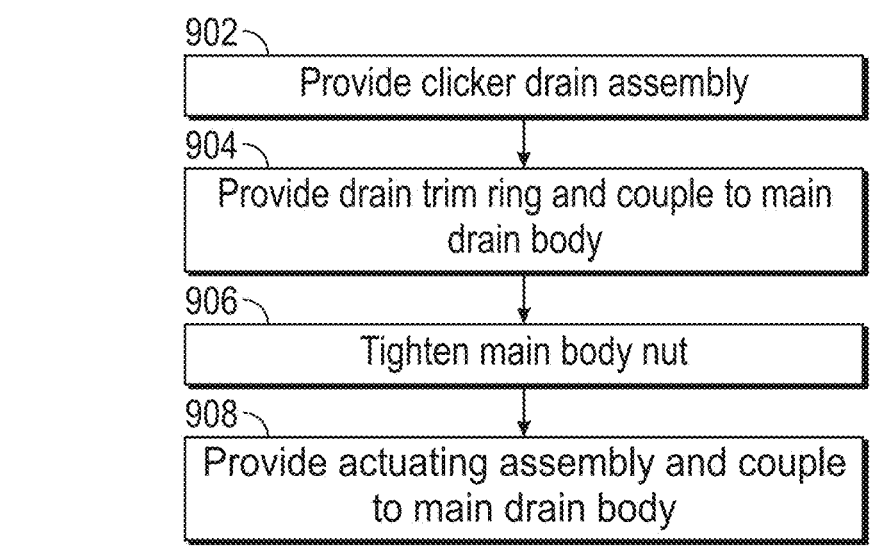
FIG. 9 is a flow chart illustrating a method for assembling the clicker drain assembly, in accordance with an exemplary embodiment of the present disclosure.

Referring to FIG. 9, a method 900 for assembling a clicker drain assembly. At 902, assembly main drain body is provided and configured to be installed in a basin (e.g., a sink or a bathtub) and drain. The main drain body is a single unitary member, thus reducing the number of leak paths as compared to a split body configuration. The main drain body is provided with a main body seal, a main body washer, and a main body nut disposed around the main drain body and below an overflow opening. At 904, a drain trim ring is provided and configured to couple to the main drain body. For instance, a ring body of the drain trim ring is threadably coupled to a threaded portion of the main drain body. A flange of the drain trim ring extends radially outward from the main drain body such that when the main drain body is installed in a drain, the flange interfaces with a drain opening of the drain and secures the main drain body in place. Further, the main body nut may be threadably coupled to the threaded portion to secure the main body seal and main body washer in place. For instance, at 906, the flange is on an outer surface of the drain opening and the main body nut is tightened to tighten the main body seal and the main body washer against the opposite surface of the drain opening from the flange. At 908, an actuating assembly is provided and coupled to the main drain body. The clicker drain assembly includes a drain stopper assembly and a clicker drain seal. For instance, the actuating assembly is received by clicker drain seal and the drain trim ring such that the clicker drain seal fits between the flange and the actuating assembly, and the drain stopper assembly is coupled to the actuating assembly to facilitate actuating the actuating assembly between a released state and a compressed state. The released state maintains the clicker drain assembly in an open position such that fluids can flow through the main drain body of the clicker drain assembly. The compressed state maintains the clicker drain assembly in a closed position such that fluids cannot flow through the main drain body of the clicker drain assembly.

Thus, the present disclosure provides a drain assembly having a single drain body, the drain stopper operable by a user via an actuating assembly that can be quickly and easily installed to a basin and reducing leak paths.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A clicker drain assembly, comprising:
   a main drain body;
   an actuating assembly;
     wherein the actuating assembly further comprises:
       a spring;
       a cam insert;
       a gasket; and
       a support stem coupled to the main drain body; and
   a stopper assembly coupled to the actuating assembly and configured to actuate the actuating assembly when pressed by a user.

2. The clicker drain assembly of claim 1, wherein the main drain body further comprises two overflow openings positioned proximate a first end of the main drain body, and wherein the two overflow openings are positioned opposite one another.

3. The clicker drain assembly of claim 1, wherein the main drain body further comprises an internal cavity having a first diameter;
   wherein the stopper assembly comprises a stopper head having a second diameter; and
   wherein the second diameter is greater than the first diameter to seal the internal cavity when the stopper head is in a closed position.

4. The clicker drain assembly of claim 1, wherein the clicker drain assembly further comprises a drain trim ring, the drain trim ring comprising:
   a ring body defining an annular body;
   an angled surface; and
   a flange.

5. The clicker drain assembly of claim 4, further comprising a clicker drain seal, wherein the drain trim ring coupled to the main drain body and configured to receive the clicker drain seal and the actuating assembly.

6. The clicker drain assembly of claim 5, wherein the clicker drain seal is configured to abut an inner portion of the angled surface and is configured to interface with the stopper assembly.

7. The clicker drain assembly of claim 1, wherein the stopper assembly further comprises:
   a stopper head; and
   a stopper body configured to mate with the stopper head.

8. The clicker drain assembly of claim 1, wherein the main drain body is a stainless steel main drain body.

9. A drain assembly, comprising:
   a main drain body with a first end and a second end, the main drain body comprising:
     one or more overflow openings positioned proximate the first end; and
     an engagement structure disposed along at least a portion of the main drain body proximate the first end; and
   a spring biased actuating assembly at least partially received within the main drain body, the spring biased actuating assembly selectively repositionable between an open position and a closed position,
     wherein a spring inside the spring biased actuating assembly is in a compressed position when the spring biased actuating assembly is in the closed position, and wherein the spring is in an extended position when the spring biased actuating assembly is in the open position.

10. The drain assembly of claim 9, wherein the main drain body further comprises:
    a main body seal;
    a main body washer; and
    a main body nut disposed around the main drain body;
      wherein the main body seal, the main body washer, and the main body nut extend radially outward from an outer surface of the main drain body.

11. The drain assembly of claim 9, wherein the drain assembly further comprises a drain trim ring configured to interface with the main drain body to form a seal, the drain trim ring comprising:
    a ring body defining an annular body;
    an angled surface; and
    a flange.

12. The drain assembly of claim 11, wherein the drain assembly further comprises a stopper assembly, the stopper assembly comprising:
    a stopper head; and
    a stopper body configured to mate with the stopper head.

13. The drain assembly of claim 12, further comprising a clicker drain seal configured to abut an inner portion of the angled surface and configured to interface with the stopper assembly.

14. The drain assembly of claim 9, wherein the spring biased actuating assembly further comprises:
    a cam insert;
    a gasket; and
    a support stem coupled to the main drain body.

15. The drain assembly of claim 9, further comprising a stopper assembly comprising:
    a stopper head; and
    a stopper body configured to mate with the stopper head.

16. The drain assembly of claim 15, wherein the stopper assembly, a clicker drain seal, and the spring biased actuating assembly are received by a drain trim ring along a drain seal area, and wherein actuating the spring biased actuating assembly into the closed position restricts a flow of fluid through the main drain body.

17. The drain assembly of claim 9, wherein the main drain body is a stainless steel main drain body.

18. The drain assembly of claim 9, wherein the engagement structure is threads, and wherein a drain trim ring is threadably coupled to the threads between the one or more overflow openings and the first end of the main drain body.

19. A method of assembling a drain assembly, comprising:
    providing a main body;
    coupling a spring biased actuating assembly to the main body; and
    configuring a spring inside the spring biased actuating assembly to be in a compressed position when the spring biased actuating assembly is in a closed position, and an extended position when the spring biased actuating assembly is in an open position.

20. The method of claim 19, further comprising coupling a drain stopper assembly to the spring biased actuating assembly to reposition the spring biased actuating assembly between a released state and a compressed state.

* * * * *